United States Patent [19]

Oswald

[11] 4,095,137
[45] June 13, 1978

[54] DIGITAL CONVERGENCE SYSTEM FOR A MULTI-GUN CRT

[75] Inventor: Robert Clement Oswald, St. Paul, Minn.

[73] Assignee: Sperry Rand Corporation, New York, N.Y.

[21] Appl. No.: 778,900

[22] Filed: Mar. 18, 1977

[51] Int. Cl.² .................................................. H01J 29/51
[52] U.S. Cl. .................................... 315/13 C; 315/367; 315/368
[58] Field of Search .................... 315/13 C, 368, 367

[56] References Cited

U.S. PATENT DOCUMENTS

| | | | |
|---|---|---|---|
| 2,742,589 | 4/1956 | Goodrich | 315/13 C |
| 3,114,858 | 12/1963 | Schopp | 315/13 C X |
| 3,501,669 | 3/1970 | Henderson | 315/367 X |
| 3,631,296 | 12/1971 | Collie, Jr. | 315/13 C |
| 3,648,097 | 3/1972 | Merryman | 315/367 |
| 3,740,608 | 6/1973 | Manber et al. | 315/367 |
| 3,852,640 | 12/1974 | McCarthy | 315/367 X |
| 3,895,252 | 7/1975 | Funakawa et al. | 315/13 C |

Primary Examiner—Malcolm F. Hubler
Attorney, Agent, or Firm—Douglas L. Tschida; Kenneth T. Grace

[57] ABSTRACT

A convergence correction system is disclosed for digitally controlling the convergence correction signals applied to the convergence correction coils of a color CRT. The convergence correction signals correspond to a plurality of segments defined for the phosphor face of the CRT, so as to produce the convergence of the associated electron beams at the phosphor triads within the individual segments. The system provides for the independent adjustment of the convergence of each electron beam within each of the four quadrants of the phosphor face, independent of the adjustments for the convergence of the other electron beams. The system further provides for the use of only one convergence correction coil for each associated electron beam.

16 Claims, 11 Drawing Figures

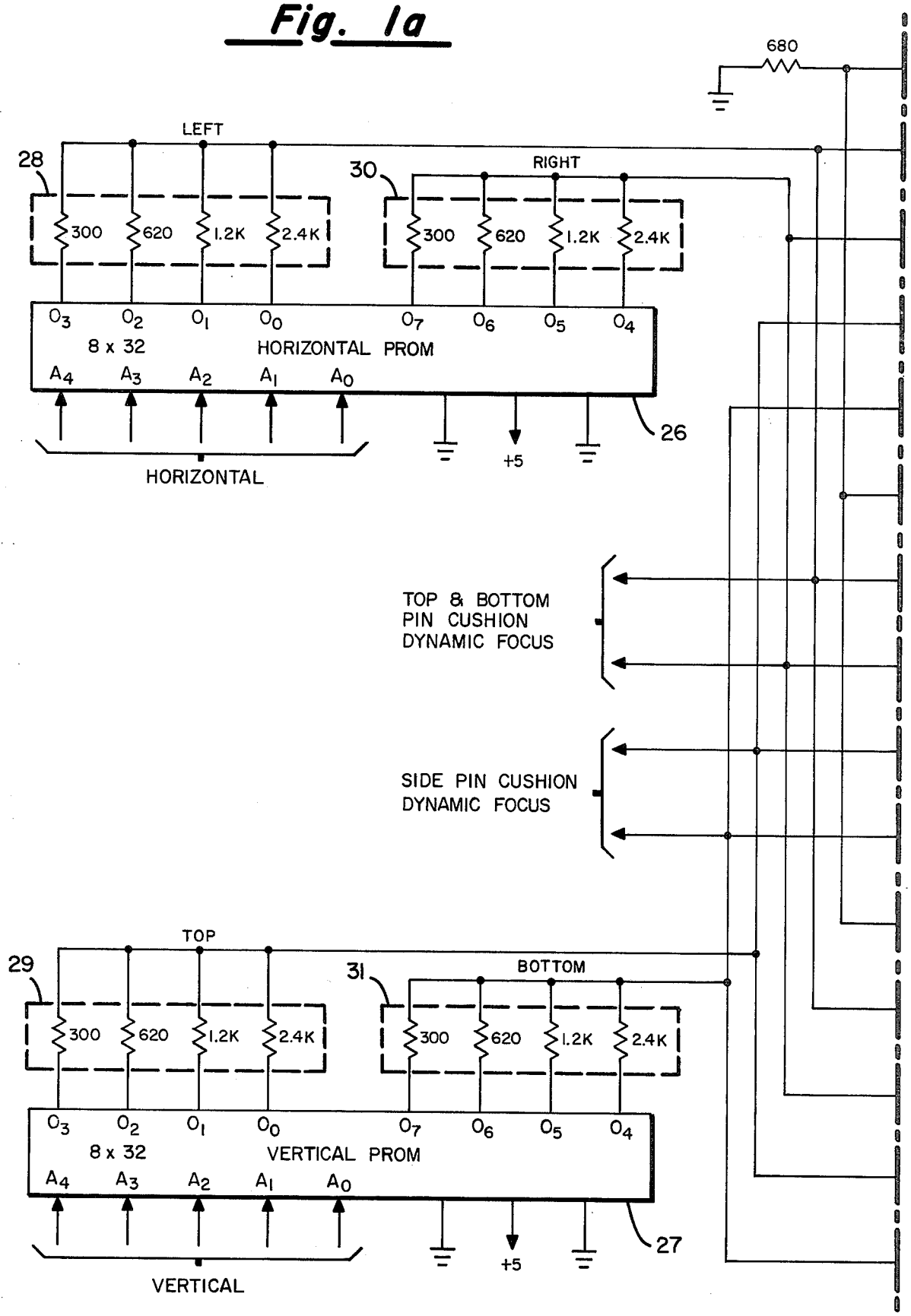

DIGITAL CONVERGENCE SYSTEM FOR A MULTI-GUN CRT

GOVERNMENT CONTRACT

The invention herein described was made in the course of or under a contract or subcontract thereunder, with the United States Air Force.

BACKGROUND OF THE INVENTION

The invention disclosed herein addresses itself to the problem of correcting the deflection of the electron beams produced by the color guns of a color cathode ray tube (CRT) so that the beams will coincide and strike the same phosphor triad on the face of the CRT. Improper convergence is undesirable as it detracts from the definition of the images displayed.

The display of alphanumeric information produced by digital data systems utilizing CRTs is limited by the inability to represent the data in multi-color formats. While a myriad of techniques are available for producing color images, the use of a color CRT display provides many advantages. The availability, design and economic considerations, among others, make a CRT a more desirable candidate as the means for displaying digital information. The present invention may also be used in other applications using multi-gun CRT's, but would probably required some design changes to provide the requisite address information to the control circuitry taught by the present invention.

Color CRT's typically utilize three color guns each of which generates an electron beam that excite the respective red, blue or green phosphors coated on the face of the CRT. These beams are deflected magnetically so as to cause the beams to pass through the minute holes of a shadow mask, which is positioned between the guns and the phosphor face of the CRT. Correction coils provide corrective deflections to each electron beam prior to the deflection of the beams by the deflection yoke so that each of the beams will pass through the same hole in the shadow mask and strike its respective phosphor dot in the phosphor triad, and thereby produce a chromatic spot on the screen. The color of the spot will depend on the intensity of the respective electron beams when they strike the phosphor triad. These correction coils are required since the three color guns are positioned differently and therefore require different amounts of correction to cause the respective gun's electron beam to pass through the same hole in the shadow mask.

Presently the correction signals are generated by pulse shaping circuits. These circuits utilize inductors, resistors, capacitors and diodes to control the amplitude and overall waveshape of the correction signals. There is no independent correction control over the precise waveshape for the individual guns, however. Only the composite of the correction signals for each of the guns can be adjusted to achieve an overall convergence, and there is no control for the convergence at specific points on the CRT phosphor. The convergence signals interact so that adjustment for one gun affects the others.

The adjustment procedure further requires an interative approach. Convergence is set for the center of the CRT and then for the sides, but adjusting one color on one side may effect another color on the other side. A several step, best approximation procedure is therefore employed which is tedious and cumbersome.

Present systems also require the use of two convergence coils for each gun, one for horizontal correction and the other for vertical correction. The present invention however, requires the use of only one convergence coil for each color gun, and operates so as to provide individual control over the convergence correction for each electron beam, over the entire face of the CRT. The correction signals to each electron beam are independent of each other, and the individual beams can be additionally adjusted for each of the four quadrants of the face of the CRT.

SUMMARY OF THE INVENTION

The present invention consists of circuitry for producing convergence correction signals for each of the three convergence correction coils associated with the three color guns of a color CRT. The correction signals are adjustable, and the adjustment affecting each electron beam is independent of any adjustment to the other electron beams' convergence correction. The ability to independently adjust the correction signals to each of the coils provides for the precise convergence of the electron beams within any segment defined for the phosphor face of the CRT. This improved convergence permits the adjustment of the convergence with a minimum of time and effort for the entire phosphor face of the color CRT.

The invention includes the use of two programmable, read-only memories which operate to produce digital signals, which are converted to analog signals, that are indicative of the addresses defining segments of the phosphor face of the CRT. The specific addresses are selected while the face of the CRT is being scanned in a raster scan method. The analog signals, i.e., the segment coordinates, for each of the segments scanned, are inputted into analog voltage dividers associated with the convergence correction for each of the three color guns. The voltages obtained from each of the voltage divisions are then summed and three resultant voltages, one for each color, are produced which are inputted into operational amplifiers. The operational amplifiers produce outputs which are used to drive associated transistors and depending on how hard the transistors are turned on, differing collector currents will result. The convergence correction coils are connected between the collectors of the transistors and a positive DC source so that the collector current induces a magnetic field within the convergence correction coils. This varying field then produces the proper correction to the associated electron beam, before all of the electron beams are further deflected by the deflection yoke.

A feedback signal is further produced at the emitter of the respective transistors and is connected back to the summing junctions for each of the colors so that the operating point of the respective transistors can be regulated and stabilized. The feedback signal therefore insures that the current through the respective convergence correction coils results only from the input analog signals.

A constant DC voltage level for each analog control circuit is also provided, so that convergence can be achieved for each color gun at the center of the phosphor face.

The invention further provides the ability to adjust the correction signal to each color's convergence coil, so that the convergence of each color can be adjusted within each quadrant of the phosphor face, independent of the other colors and independent of the other quad-

DESCRIPTION OF THE PREFERRED EMBODIMENT

Figure 4:
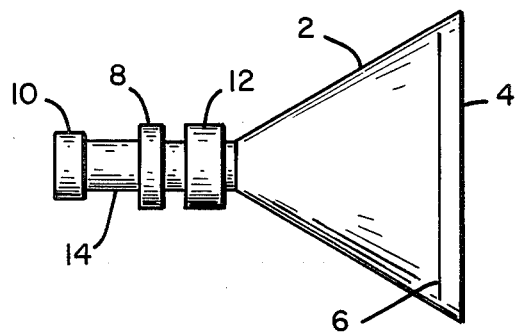
FIG. 4 illustrates the respective positioning of components of a typical CRT.
Figure 5:
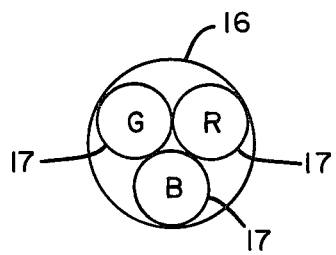
FIG. 5 illustrates an individual phosphor triad and its associated phosphor dots.

The invention disclosed herein is for a convergence correction circuit for a typical color cathode ray tube. The CRT 2 used in the preferred embodiment is a three gun color CRT which has red, green and blue color guns 10. A typical color CRT 2 is shown in FIG. 4 and a single phosphor triad 16 of the type with which the phosphor face 4 is coated is shown in FIG. 5. Under normal operation of such a CRT, three electron beams are generated by the three color guns 10—see FIG. 7; corrective deflection fields are provided by the convergence correction yoke 8 to individually deflect each of the beams to compensate for the gun positions; and a deflection field is generated by the deflection yoke 12 to cause the three beams to pass through a specific hole in the shadow mask 6 and thereby strike a specific phosphor triad 16 on the face 4 of CRT 2. The three beams should converge on the same phosphor triad 16 and strike their respective phosphor dot 17 in the triad 16 to thereby produce a chromatic dot which is used to make up an image on the CRT's viewing face 4.

In the preferred embodiment, the color CRT 2 is used for displaying alphanumeric information, which information is displayed in a format of 80 characters per row with a maximum of 24 rows. The characters are displayed in five by seven dot character arrays, but other arrays requiring different formats may also be displayed as well as other images. The CRT 2 used in the preferred embodiment is scanned in a raster scan method using well-known interlace scanning techniques. The face 4 of the CRT is divided into 525 lines, which are scanned at a horizontal rate of 15.734 KHz and a vertical rate 59.94 Hz. The invention disclosed uses the address information generated for the individual characters to be displayed and the interlaced scan, to provide information indicative of a plurality of segments defined for the face 4 of CRT 2.

The face 4 of CRT 2, in the preferred embodiment, is segmented into 20 horizontal increments with 24 vertical rows. The face 4 is therefore divided into 480 segments, which for the CRT 2 used in the preferred embodiment would mean that each segment defines an area approximately ½ inch long by ⅓ of an inch high. Each of these segments are defined by a horizontal and vertical address indicative of the specific horizontal and vertical coordinates for each segment and these addresses are inputted to the PROMs 26 and 27 of the convergence correction circuitry, see FIGS. 1 and 2, as the face 4 of the CRT is scanned.

In a similar manner the screen is further subdivided for the character display information so that an address is dedicated to each of the possible character locations that might be displayed upon the entire face 4 of CRT 2. For the 80 × 24 character format arrangement described above, this would mean that 1,920 specific character addresses are necessary. Because the character locations are smaller than those defined for the convergence circuitry, more than one of the smaller locations will be defined for each of the segments which are used by the convergence correction circuitry. Recognizing this fact, the convergence circuitry utilizes only a portion of the address information defined for the smaller character locations. In the preferred embodiment the character addresses are defined by seven bits of horizontal information and five bits of vertical information. It is therefore possible to use only a portion of these addresses to define the coordinates of the segments used by the convergence correction circuitry. The invention disclosed does this by using only the five most significant bits of the 7-bit horizontal character address and all five bits of the 5-bit vertical character address as the address information which are inputted to the PROMs 26 and 27, respectively.

Figure 1B:
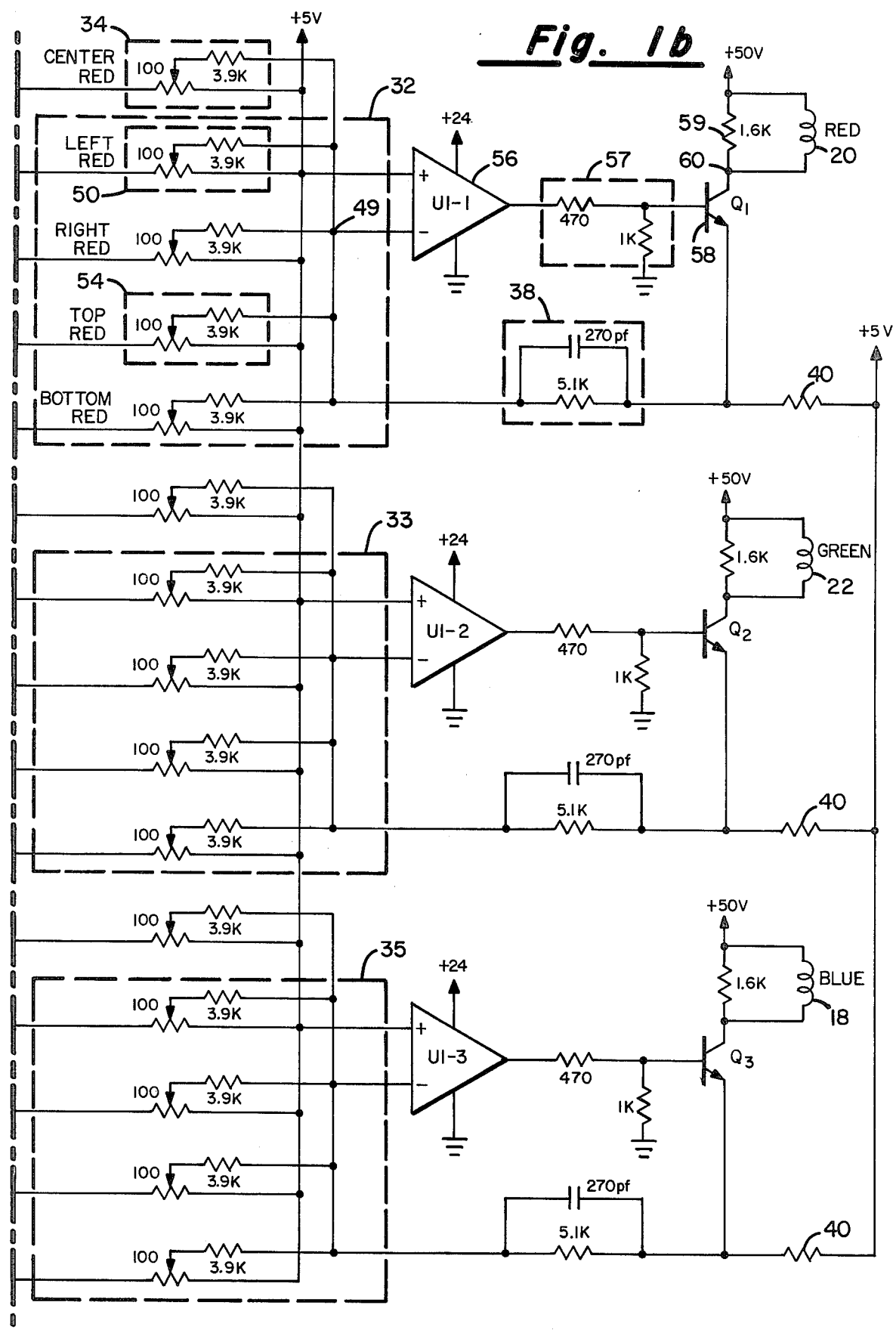
FIG. 1, consisting of FIG. 1a and FIG. 1b, is a schematic diagram of the convergence correction circuitry of the present invention.

The typical circuitry for the convergence correction circuit is shown in FIG. 1. This circuit consists of two programmable read-only memories (PROMs) which define one of 32 possible address locations, for each 5-bits of input address information, by an 8-bit address word; the horizontal PROM 26 is dedicated to horizontal address information, and the vertical PROM 27 is dedicated to vertical address information. As the face 4 of CRT 2 is scanned, the 5 bits of the horizontal and of the vertical address information are inputted to the horizontal 26 and vertical 27 PROMs, respectively, and are used to define the coordinates of each of the convergence correction segments.

As the PROMs 26 and 27 are addressed, each of the 5 bits of horizontal and vertical input address information will produce a respective 8-bit output from each of the respective PROMs 26 and 27. Only 4 bits of each of the 8-bit affect will effect the convergence correction in the quadrant being scanned; since the other 4 bits of each of the 8-bit outputs will produce a +5 volt digital-to-analog converter output, which +5 volts won't affect the output of the analog means 32, 33 and 35, and which hereinafter will be described more fully. The outputs from the PROMs 26 and 27 wll correspond to left or right, or top or bottom, respectively. In this manner the PROMS 26 and 27 effectively produce 4-bit outputs, which correspond to the coordinates of each of the convergence correction segments within each of the quadrants of the face 4 of the CRT 2. Depending upon where the raster scan is at a specific point in time, the outputs of the PROMs 26 and 27 will coincide within one of the four quadrants of the phosphor face 4 and will be used to provide convergence correction signals for the segment being addressed.

Figure 2:
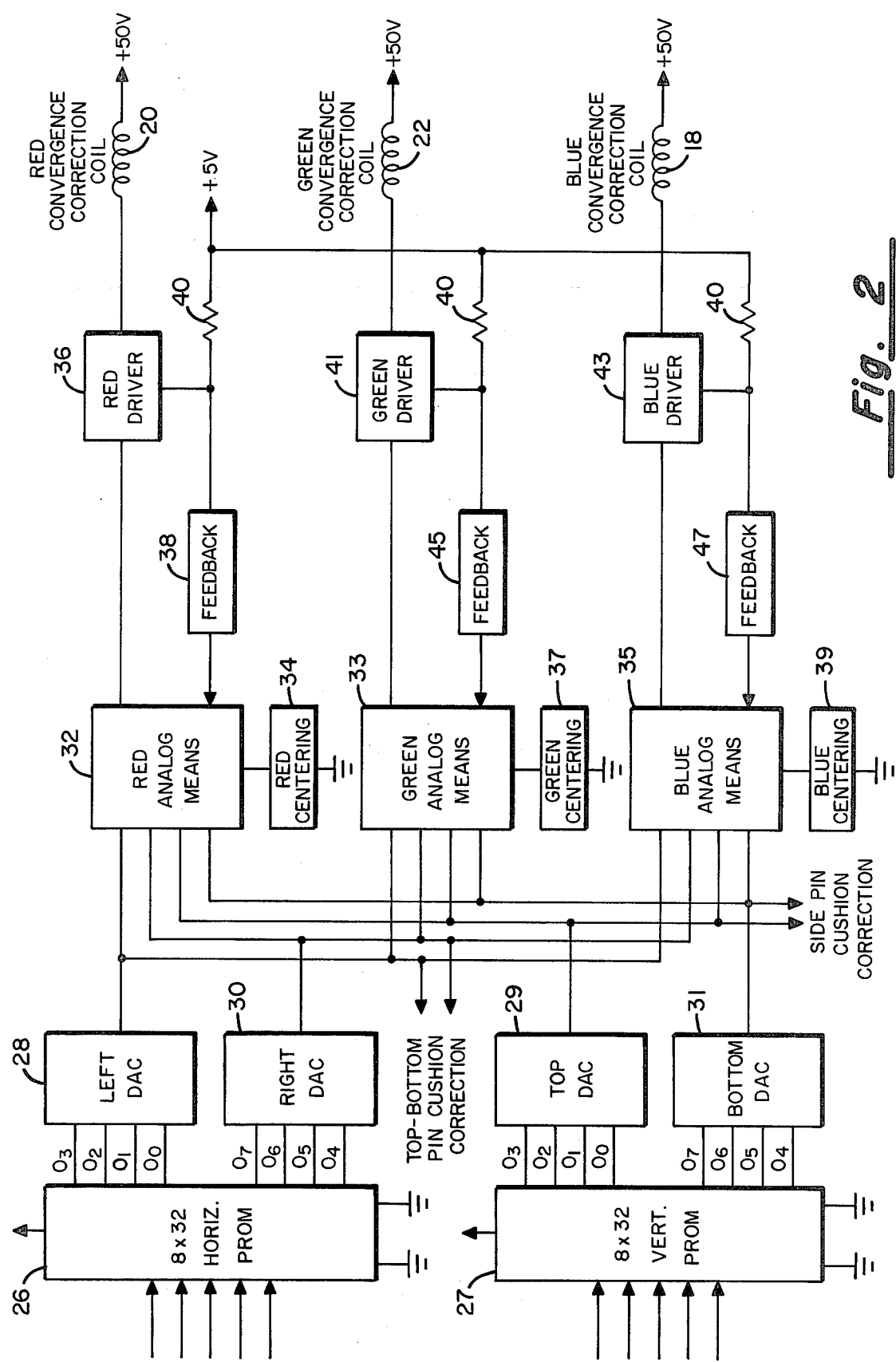
FIG. 2 is a block diagram of the convergence correction circuitry of FIG. 1.

Referring to FIG. 2, a block diagram of the convergence control circuitry is shown. From this figure it can be seen that the 8-bit outputs of each of the horizongtal 26 and vertical 27 PROMs are each connected to two digital-to-analog converters (DAC) 28, 30 and 29, 31, respectively. The digital-to-analog converters correspond to the portions of the PROMs that are dedicated to the left, right, top, and bottom halves of face 4 of CRT 2. The outputs of the respective digital-to-analog converters are each connected to the analog circuitry 32, 33 and 35 for each of the three convergence correction coils 20, 22 and 18. In this manner analog signals are produced for individually deflecting each of the electron beams of each of the color guns 10, for each convergence correction segment, so that the convergence of each of the color guns 10 can be controlled over the entire face 4 of CRT 2.

The analog circuitry 32, 33 and 35 manipulates the respective analog signals from PROMs 26, 27 so as to provide a resultant analog correction signal for each convergence correction coil. The manipulation of the analog signals is accomplished by voltage division and junction summing techniques, and the circuitry is such that the resultant analog signals can be adjusted for each of the three convergence correction coils 18, 20 and 22, independent of the other two convergence coils, for each of the quadrants of the face 4 of CRT 2.

The resultant analog signal from each of the three analog means 32, 33 and 35 is then connected to an amplifier-driver circuit 36, 41 and 43, where the resultant analog signal is used to provide the proper correction to the respective convergence correction coil 20, 22 and 18 for each of the color guns. A feedback signal, produced by each amplifier-driver circuit, is connected to the summing junction of the respective analog circuitry 32, 33 and 35, and ensures that the correction coil current is due to the respective resultant analog signal.

Figure 6:
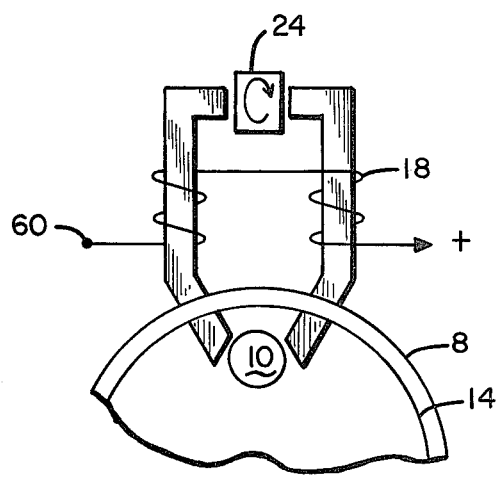
FIG. 6 illustrates an individual convergence correction coil and its relationship to its associated color gun.

The amplifier-driver circuit 36, 41 and 43 for each of the color guns 10 is connected to its respective convergence correction coil 20, 22 and 18, which are mounted in a convergence correction yoke structure 8. The location of the convergence correction yoke 8 can be seen in FIG. 4. It should be noted that the convergence correction yoke 8 is positioned after the individual color guns 10 yet prior to the deflection yoke 12. In this manner, convergence correction is supplied to the associated electron beam of each of the respective three color guns 10 prior to deflection by the deflection yoke 12. The mounting position of each of the convergence correction coils 18, 20 and 22 with respect to the individual color guns 10 can be seen in FIG. 7. Typically the coils are spaced 120° apart to correspond to the particular color gun 10 placement; however they can be positioned in any other manner to correspond to other color gun 10 arrangements. FIG. 6 further shows a typical convergence correction coil 18 and how it is positioned with respect to an individual color gun 10 and the neck 14 of CRT 2.

Because the basic circuitry for each of the three convergence correction coils 18, 20 and 22 is substantially similar, the typical sequence of events which occur during a typical scan of the CRT will be described for only the red convergence coil 20. For further clarification, the sequence of events will be described for a single convergence correction segment, recognizing that the same sequence of events will occur for each and every segment defined for the face 4 of CRT 2. Therefore, referring to FIGS. 1 and 2, five bits of digital information corresponding to the respective horizontal and vertical coordinates for the segment are inputted to the horizontal 26 and vertical 27 PROMs. Assuming that the segment in question being scanned is in the upper lefthand quadrant of the CRT face 4, the PROMs 26 and 27 will be inputted with address information that will produce a digital output from the horizontal PROM 26 indicative of the left half of the face 4 and a digital output from the vertical PROM 27 indicative of the top half of the face 4. In this manner, a digital output will be produced by each of the PROMs 26 and 27 which will coincide in the top-left quadrant and define the X-Y coordinates of the segment under inspection.

Figure 3B:
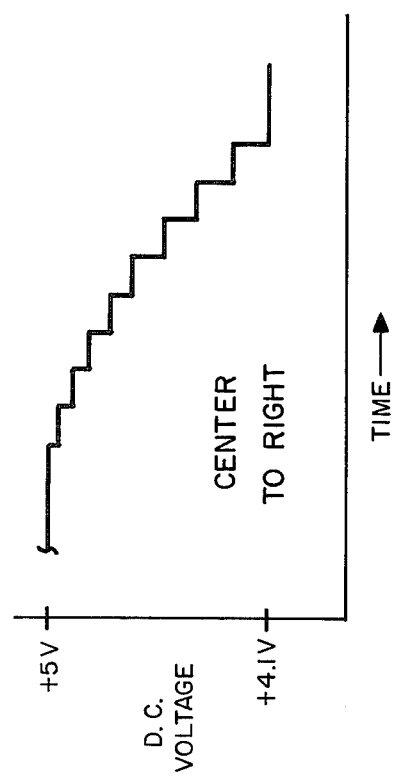
FIGS. 3a, 3b, 3c and 3d are representations of the typical waveshapes produced as outputs from the respective digital-to-analog converters 28, 30, 29 and 31, shown in FIGS. 1 ad 2.
Figure 3D:
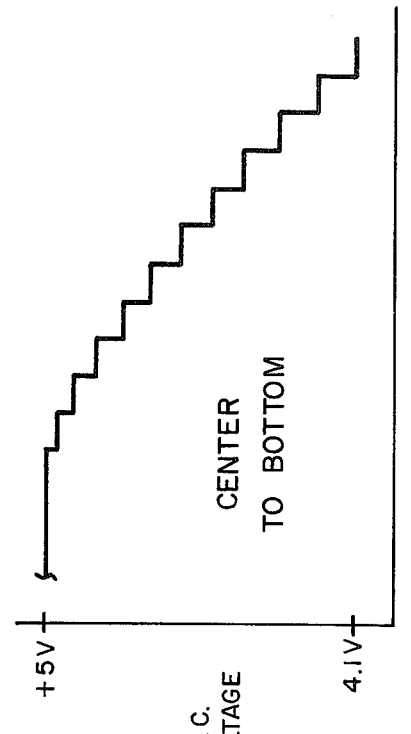

The effect 4-bit output of the horizontal PROM 26 is connected to the left digital-to-analog converter 28, and the effective 4-bit output of the vertical PROMs 27 is connected to the top digital-to-anaog converter 29. The four digital-to-analog converters 28, 30, 29 and 31, used in the circuitry of FIGS. 1 and 2, are identical in that each consist of four resistors connected in parallel. Each of the resistors is connected to an associated one bit of the effective 4-bit output of its respective PROM, and the other sides of the four resistors are connected in common. The resistor values selected for each of the bit positions are typically selected to be approximately twice the value selected for the next most significant bit position. The resistor combinations will therefore produce a different resultant resistance value depending upon the specific digital output generated from its associated PROM 26 or 27. Depending upon the resistance combination selected by the output of the PROM, a different analog voltage will be generated as the output of the digital-to-analog converter. In the preferred embodiment this voltage will typically vary between +4.1 volts and +5.0 volts in the manner as shown in FIGS. 3a, 3b, 3c and 3d for the digital-to-analog converters 28, 30, 29 and 31, respectively. The analog voltage steps, which correspond to the segment under inspection, generated by the top and left digital-to-analog converters 29 and 28 are then connected to the voltage dividers 50 and 54, of analog means 32, corresponding to the top-left indication for the red convergence coil 20. The outputs of the right and bottom digital-to-analog converters 30 and 31, as seen in FIGS. 3b and 3d, will be at a +5 volts during the scan of the top-left quadrant and will not affect the convergence correction.

The four voltage dividers used in each of the three analog means 32, 33 and 35 in the preferred embodiment, consist of four potentiometers connected in parallel to the respective outputs of the four digital-to-analog converters on one side and a +5 volt DC source on the other side. The potentiometer slides are each connected to a resistor, the other sides of which is further connected to a summing junction 49 that is a common point with the associated resistors for the center, left, right, top and bottom potentiometers. The potentiometers and fixed resistors used in the voltage dividers are selected to have the typical values shown in FIG. 1. It is through the use of these potentiometers that the adjustment is made to the convergence correction signals for each quadrant, the adjustment for each of the three convergence coils 18, 20 and 22 being independent of the adjustment of the two other convergence coils. The adjustment of the individual potentiometers of each analog means 32, 33 and 35 adjusts the correction to a specific color gun's electron beam for left, right, top or bottom depending upon which potentiometer is varied.

The resultant analog voltage that is produced at the summing junction 49 is next connected to an operational amplifier 56, where it will be compared with a reference voltage level, typically a +5 volts; and the slight difference, on the order of 2 mv, will be amplified and used to drive the base of an associated transistor 58 through another voltage divider 57. The transistor 58, in turn, is used to drive the red convergence correction coil 20.

Convergence correction coil 20 is connected between a DC voltage source, typically a +50 volts, and the collector of the driver transistor 58, and is connected in parallel with a resistor 59, which also is connected to the +50 volt DC source on one side and the collector of transistor 58 on the other side. The resistor 59 value will be the same for each of the three color guns 10 and is used for damping of the convergence coil 20 output. The convergence coils 20, 22 and 18 will therefore have different current levels depending on the base voltage of the associated transistors $Q_1$, $Q_2$ and $Q_3$, and thereby produce varying magnetic fields. It is the variation of the magnetic field of the convergence coil that is used to provide the proper correction to the electron beam of the respective color gun, prior to the deflection of all of the electron beams by deflection yoke 12.

The emitter of the transistor 58, which is used to vary the current to the convergence correction coil 20, is connected in a feedback arrangement through a parallel resistance-capacitance combination 38 to the summing junction 49. The emitter of transistor 58 is also connected through a sense resistor 40 to a +5 volt DC source, to cause the voltage at the summing junction 49 to be held within a few millivolts of the reference voltage of the operational amplifier 56, which also is at +5 volts. In this manner the operating point of transistor 58 is stabilized, and this ensures that the operating current of convergence correction coil 20 results from the analog signals produced by the PROMs.

While the typical sequence of events which takes place during the scanning of the face of the CRT has been described with reference to the red convergence coil 20 and a segment in the top-left quadrant, it must be recognized that a similar sequence of events occurs for each and every segment, for each of the individual convergence coils 18, 20 and 22 as the face 4 of CRT 2 is scanned.

Figure 3A:
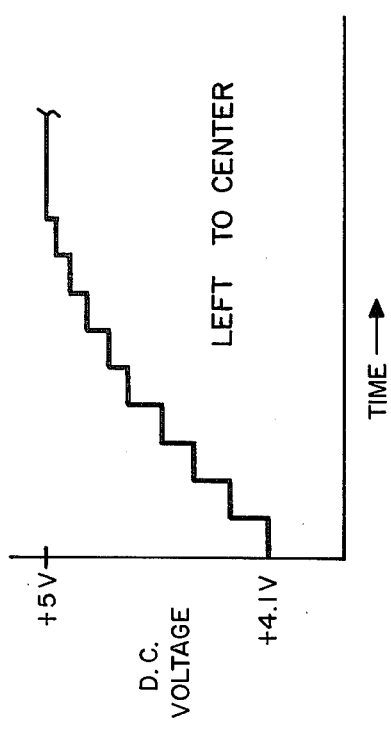

Referring to FIGS. 3a and 3b the typical waveshapes of the analog voltages produced as the outputs of the respective horizontal digital-to-analog converters 28 and 30 can be seen to vary in 10 voltage steps from a +4.1 volts to +5 volts and then from a +5 volts back down to a +4.1 volts in 10 similar steps as the face 4 of the CRT is scanned from left to right over the 20 horizontal segments. The waveshapes of the outputs of the vertical digital-to-analog converters 29 and 31, see FIGS. 3c and 3d, are similar to that of the horizontal digital-to-analog converters 28 and 30, except that the outputs vary in 12 voltage steps from a +4.1 volts to a +5 volts and then from a +5 volts back down in 12 similar steps to +4.1 volts as the face 4 of CRT 2 is scanned from top to bottom over the 24 rows.

Figure 3C:
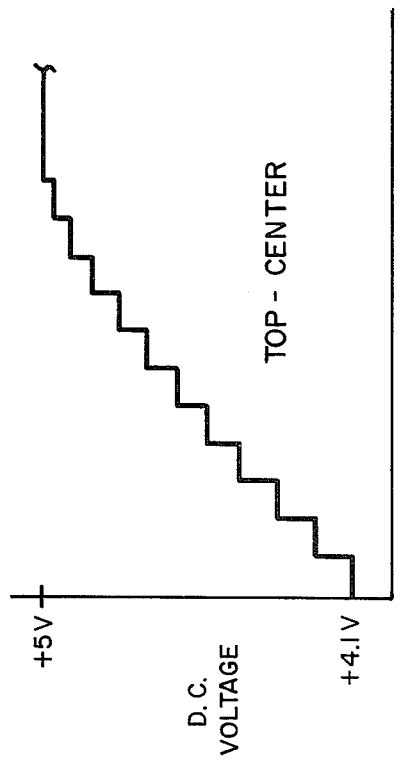

It should be noted that the voltage levels of the steps correspond to the 16 possible outputs of the four bits of digital data produced by PROMs 26 and 27 and that the rise and fall times for the horizontal waveshapes, FIGS. 3a and 3b, are faster then the rise and fall times for the vertical waveshapes, FIGS. 3c and 3d; where the rise and fall times correspond to the time for the outputs to vary between +4.1 volts and +5.0 volts. This results from the fact that the horizontal scan occurs at 15.734 KHz and the vertical scan occurs at 59.94 Hz. It should also be noted that the specific parabolic waveshapes generated as the outputs of the digital-to-analog converters can be varied by varying the program content of the PROMs and/or the resistance values selected for the digital-to-analog converters.

The preciseness of the convergence can also be increased by increasing the number of segments to be addressed. Increasing the number of segments however would require a respective increase in the size of PROMs 26 and 27; for the convergence required in the preferred embodiment, the 8 × 32 PROMs are sufficient.

Referring again to FIG. 1, the independent adjustment of the individual color guns 10 is achieved because the convergence control circuitry for each of the three color guns 10 is independent of the control circuitry for the other two color guns. This independence is achieved in that the individual analog control for each color gun 10 relies upon the outputs of PROMs 26 and 27; which provide effective analog voltages to only two of the voltage dividers of each of the analog means 32, 33 and 35 at all times; and which voltage waveshapes are unique, depending upon which quadrant is selected. Only the voltage dividers, corresponding to the quadrant being scanned, can be adjusted to affect that quadrant. Therefore, if the top-left quadrant is being scanned and adjustment is desired for the red convergence, only adjustment to the top 54 and left 50 voltage dividers will affect the red electron beam. The right and bottom voltage dividers will have no net voltage developed across them, since the outputs of the left 28 and bottom 31 digital-to-analog converters will each be at +5 volts, and will therefore not affect the top-left quadrant.

The amount of adjustment is greatly minimized from the previously used techniques where LRC circuits with diodes were used. In the previous techniques it was required to make several iterative adjustments to the LRC circuitry to approach a best approximation, but each adjustment affected the other adjustment and therefore the process was very slow and tedious. The present invention, however, permits the adjustment of the appropriate potentiometer for top or bottom, or right or left. Then by making a secondary adjustment, convergence for a specific quadrant can be achieved. It should be recognized that the convergence will correspond to the quadrant being scanned, since the 8-bit outputs to the PROMs 26 and 27 will affect only the two voltage dividers, of each of the analog means 32, 33 and 35, which correspond to the quadrant being scanned. The convergence correction can, in this manner, be adjusted for each color gun 10 and each quadrant without affecting the adjustment of the other color guns and quadrants.

The circuitry of the present invention also provides for convergence correction control at the center of the CRT. This is achieved by connecting an additional centering voltage divider 34, 37 and 39 to the summing junction of the individual color analog circuits 32, 33 and 35. The typical voltage divider for centering consists of a potentiometer connected to a +5 volt DC source on one side and ground through an appropriate resistance, i.e., 680 ohms, on the other side and having the slide of the potentiometer connected to a resistance value, i.e., 3.9K ohms, that is identical to that used in the other position voltage dividers, and which resistance is then connected to the summing junction. By using the additional voltage divider described, it is possible to achieve convergence at the center of the face 4, since PROMs 26 and 27 do not provide a digital output indicative of the center of the phosphor face 4.

Figure 7:
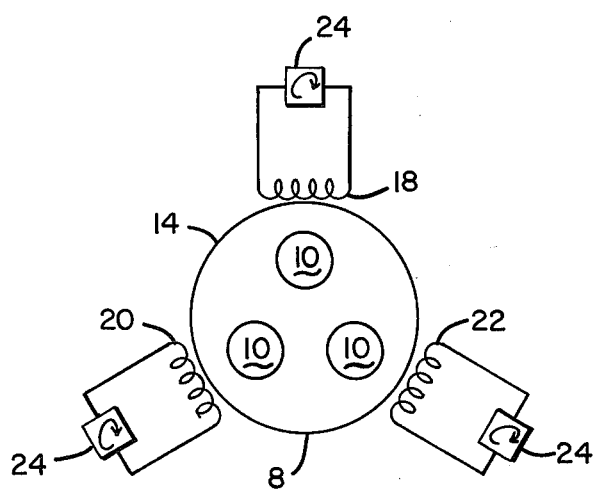
FIG. 7 illustrates the convergence correction yoke used in the preferred embodiment of the present invention and the relationships of the individual convergence correction coils to their associated color guns.

Referring to FIGS. 6 and 7 the typical convergence correction coils can be seen in their relationship to the individual color guns 10 and to the neck 14 of the CRT. It should be noted that only a single coil is required to provide the necessary convergence correction for each color gun since the circuitry for each color gun of the present invention provides a resultant field indicative of both the X and Y coordinates, and it is therefore no longer necessary to provide individual convergence correction coils for the horizontal and the vertical correction for each of the color guns 10. A single convergence correction coil 18, 20 and 22 can now be used.

It should be noted that the convergence correction coils 18, 20 and 22 of the present invention have a variable permanent magnet 24 built into the core of the coil. The variable permanent magnets 24 permit adjustment to obtain a steady field for each of the convergence coils and are typically set in conjunction with making the centering adjustments, and are not changed thereafter.

It should be further noted that the convergence correction that is produced by the convergence correction circuitry disclosed herein produces the corrective deflection along a line which is perpendicular to the field created by the individual coils.

What is claimed is:

1. A convergence correction system, comprising:
   a CRT having a plurality of electron beam generating guns, a phosphor face comprised of a plurality of phosphor dots, four quadrants and a plurality of segments defined within each of said quadrants;
   digital means for producing signals corresponding to the horizontal and vertical coordinates of each of said segments; and,
   convergence correcting means coupled to each of said electron beams, produced by said guns, and responsive to said signals for independently converging the associated electron beams within each of said quadrants.

2. A convergence correction system as set forth in claim 1, wherein said digital means comprises:
   a first and a second read-only memory;
   a first and a second digital-to-analog converter means connected to said first read-only memory for producing analog signals that correspond to the horizontal coordinate of each of said segments; and,
   a third and fourth digital-to-analog converter means connected to said second read-only memory for producing analog signals that correspond to the vertical coordinate of each of said segments.

3. A convergence correction system as set forth in claim 2, wherein said convergence correcting means comprises:
   analog means responsively coupled to said analog signals for producing resultant analog signals, which are a function of the horizontal and vertical coordinates for each of said segments;
   converging means responsively coupled to said resultant analog signals for correctively deflecting each of the associated electron beams to strike its associated phosphor dots within each of said segments.

4. A convergence correcting system as set forth in claim 3, wherein said convergence correcting means further includes:
   driving means connected between said analog means and said converging means for amplifying said resultant analog signals.

5. Convergence correcting means as set forth in claim 4, further including:
   feedback means connected between said analog means and said driving means for stabilizing said driving means.

6. A convergence correction system as set forth in claim 3, wherein said analog means comprises:
   first analog means for dividing each of said analog signals of said first, second, third and fourth digital-to-analog converters; and,
   second analog means for summing said divided analog signals and producing a resultant analog signal, which corresponds to the horizontal and vertical coordinates for each of said segments.

7. A convergence correction system as set forth in claim 6, wherein the first analog means includes:
   means varying the division of each of said analog signals for adjusting the convergence within each of the quadrants of said CRT independently of the convergence adjustment in the other quadrants.

8. A convergence correction system as set forth in claim 3, wherein said converging means comprises:
   a plurality of coils, each associated with a separate one of said electron beams.

9. A convergence correction system as set forth in claim 3, further including centering means connected to said converging means for converging said electron beams at the center of said phosphor face of said CRT.

10. A convergence correction system as set forth in claim 9, wherein the centering means comprises a DC voltage.

11. A convergence correction system, comprising:
    a CRT having a plurality of electron beam generating guns, a phosphor face, comprised of a plurality of three dot phosphor triads, defining four quadrants and a plurality of segments defined within said quadrants;
    digital means for producing signals corresponding to the horizontal and vertical coordinates of said plurality of segments defined for the quadrants of the phosphor face of said CRT;
    analog means associated with said guns connected to said digital means for producing resultant analog signals from said signals;
    driving means connected to said analog means for varying the amount of corrective deflection of each of the electron beams produced by each of said guns;
    converging means connected to said driving means for deflecting each of the electron beams produced by each of said guns and causing each of the associated electron beams to strike its associated dot in the same phosphor triad within each of said segments;
    feedback means connected between said analog means and said driving means for stabilizing said driving means.

12. A convergence correction system as set forth in claim 11 wherein said digital means is comprised of:
    a first and a second read-only memory;
    a first and a second digital-to-analog converter means connected to said first read-only memory for producing analog signals that correspond to the horizontal coordinate of each of said segments; and
    a third and fourth digital-to-analog converter means connected to said second read-only memory for producing analog signals that correspond to the vertical coordinate of each of said segments.

13. A convergence correction system as set forth in claim 12 wherein said means is comprised of:

means for dividing each of said analog signals of said first, second, third and fourth digital-to-analog converter means;

means for summing said divided analog signals and producing a resultant analog signal, which corresponds to the horizontal and vertical coordinates for each of said segments.

14. A convergence correction system as set forth in claim 13, wherein said dividing means includes:

means varying the division of each of said analog signals for adjusting the convergence within each of the four quadrants of said CRT independently of the convergence adjustment in the other quadrants.

15. A convergence correction system as set forth in claim 11, further including centering means for converging each of said electron beams at the center of the phosphor face of said CRT.

16. A convergence correction system as set forth in claim 11, wherein said converging means is comprised of:

yoke means;

a convergence coil associated with each of said guns, each coil having a single winding and each coil contained by said yoke;

said yoke means mountably attached to said CRT and positioning each of said coils near its associated gun for deflecting its associated electron beam.

* * * * *

UNITED STATES PATENT AND TRADEMARK OFFICE
CERTIFICATE OF CORRECTION

PATENT NO. : 4,095,137

DATED : June 13, 1978

INVENTOR(S) : Robert Clement Oswald

It is certified that error appears in the above-identified patent and that said Letters Patent are hereby corrected as shown below:

Column 10, Line 68, "wherein said means" should be --wherein said analog means--.

Signed and Sealed this

Fourteenth Day of November 1978

[SEAL]

Attest:

RUTH C. MASON
Attesting Officer

DONALD W. BANNER
Commissioner of Patents and Trademarks